(12) United States Patent
Le

(10) Patent No.: US 10,883,476 B2
(45) Date of Patent: Jan. 5, 2021

(54) AIR COMPRESSION APPARATUS

(71) Applicant: NGUYEN CHI CO., LTD., Ho Chi Minh (VN)

(72) Inventor: Nguyen Thanh Le, Ho Chi Minh (VN)

(73) Assignee: NGUYEN CHI CO., LTD., Ho Chi Minh (VN)

( * ) Notice: Subject to any disclaimer, the term of this patent is extended or adjusted under 35 U.S.C. 154(b) by 0 days.

(21) Appl. No.: 16/471,084

(22) PCT Filed: Dec. 19, 2017

(86) PCT No.: PCT/JP2017/045446
§ 371 (c)(1),
(2) Date: Jun. 19, 2019

(87) PCT Pub. No.: WO2018/117072
PCT Pub. Date: Jun. 28, 2018

(65) Prior Publication Data
US 2019/0383268 A1 Dec. 19, 2019

(30) Foreign Application Priority Data
Dec. 19, 2016 (JP) .................................. 2016-245075

(51) Int. Cl.
*F03D 9/17* (2016.01)
*F03D 9/28* (2016.01)
*F03D 1/04* (2006.01)

(52) U.S. Cl.
CPC .................. *F03D 9/17* (2016.05); *F03D 1/04* (2013.01); *F03D 9/28* (2016.05); *F05B 2260/42* (2013.01)

(58) Field of Classification Search
CPC ... F03D 1/04; F03D 9/17; F03D 9/128; F03D 9/28
(Continued)

(56) References Cited

U.S. PATENT DOCUMENTS 1,267,936 A * 5/1918 Tuch ..................... F03B 13/142
60/398
4,239,977 A * 12/1980 Strutman .............. F03D 7/0224
290/44
(Continued)

FOREIGN PATENT DOCUMENTS

JP 2000-145610 A 5/2000
JP 2006-144701 A 6/2006
(Continued)

OTHER PUBLICATIONS

Jun. 5, 2018 International Search Report issued in International Patent Application No. PCT/JP2017/045446.

*Primary Examiner* — Thomas E Lazo
(74) *Attorney, Agent, or Firm* — Oliff PLC

(57) ABSTRACT

An air compression apparatus which can be used without requiring power supply equipment, including: a cylindrical body; an impeller which is provided inside the cylindrical body; a rotary shaft provided to be rotatable coaxially with the impeller; a cylindrical casing accommodating a part of the rotary shaft; a rotation transmission mechanism that transmits the rotation of the impeller to the rotary shaft while increasing the rotation speed of the rotary shaft; a piston connected via a crank unit to the rotary shaft housed in the casing; a cylinder provided on the outer peripheral wall of the casing; an introduction unit provided in a cylinder for introducing air into the cylinder; and a discharge pipe each connected to the cylinder for discharging a compressed air compressed by the piston inside the cylinder. Therefore, it is possible to provide an air compression apparatus which can be used without requiring power supply equipment.

5 Claims, 8 Drawing Sheets

(58) Field of Classification Search
USPC .......................................................... 60/398
See application file for complete search history.

(56) References Cited

U.S. PATENT DOCUMENTS

| | | | | |
|---|---|---|---|---|
| 6,139,255 | A * | 10/2000 | Vauthier | F03B 13/264 |
| | | | | 415/3.1 |
| 6,452,287 | B1 * | 9/2002 | Looker | F03D 9/25 |
| | | | | 290/55 |
| 10,066,597 | B2 * | 9/2018 | Sutz | F03D 1/04 |
| 2002/0088222 | A1 * | 7/2002 | Vauthier | F03B 17/061 |
| | | | | 60/398 |
| 2010/0006371 | A1 | 1/2010 | Link et al. | |
| 2011/0148111 | A1 * | 6/2011 | Oosterling | F04B 35/00 |
| | | | | 290/44 |
| 2013/0115068 | A1 | 5/2013 | Borgen et al. | |
| 2013/0266439 | A1 * | 10/2013 | Rubak | F01D 1/04 |
| | | | | 415/208.1 |
| 2014/0044535 | A1 * | 2/2014 | Wood | F03D 1/025 |
| | | | | 415/207 |

FOREIGN PATENT DOCUMENTS

| | | | |
|---|---|---|---|
| JP | 2009-542949 | A | 12/2009 |
| JP | 2013-524087 | A | 6/2013 |
| JP | 2016-050526 | A | 4/2016 |

\* cited by examiner

[Fig 1]
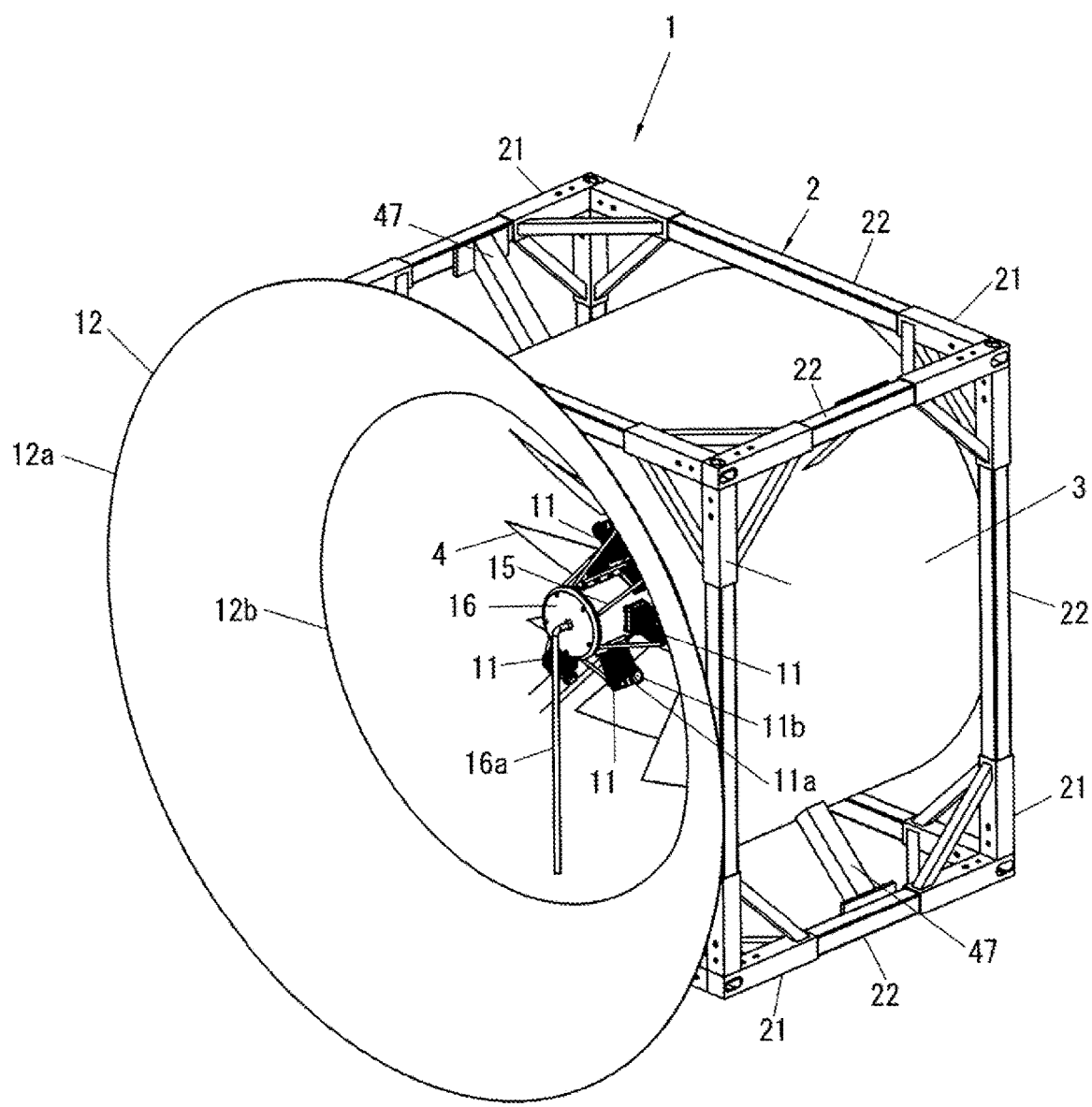

[Fig 2]
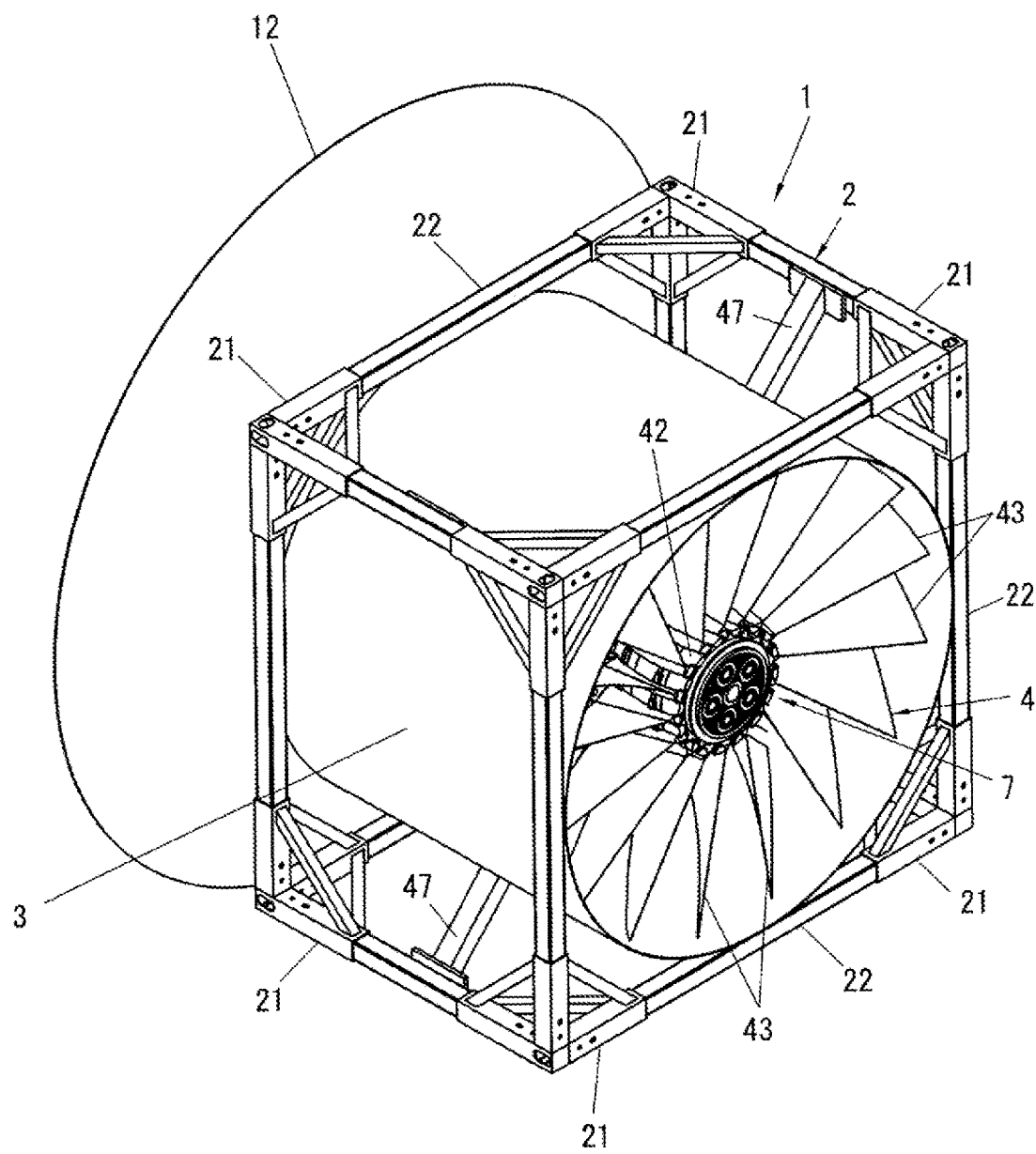

[Fig 3]
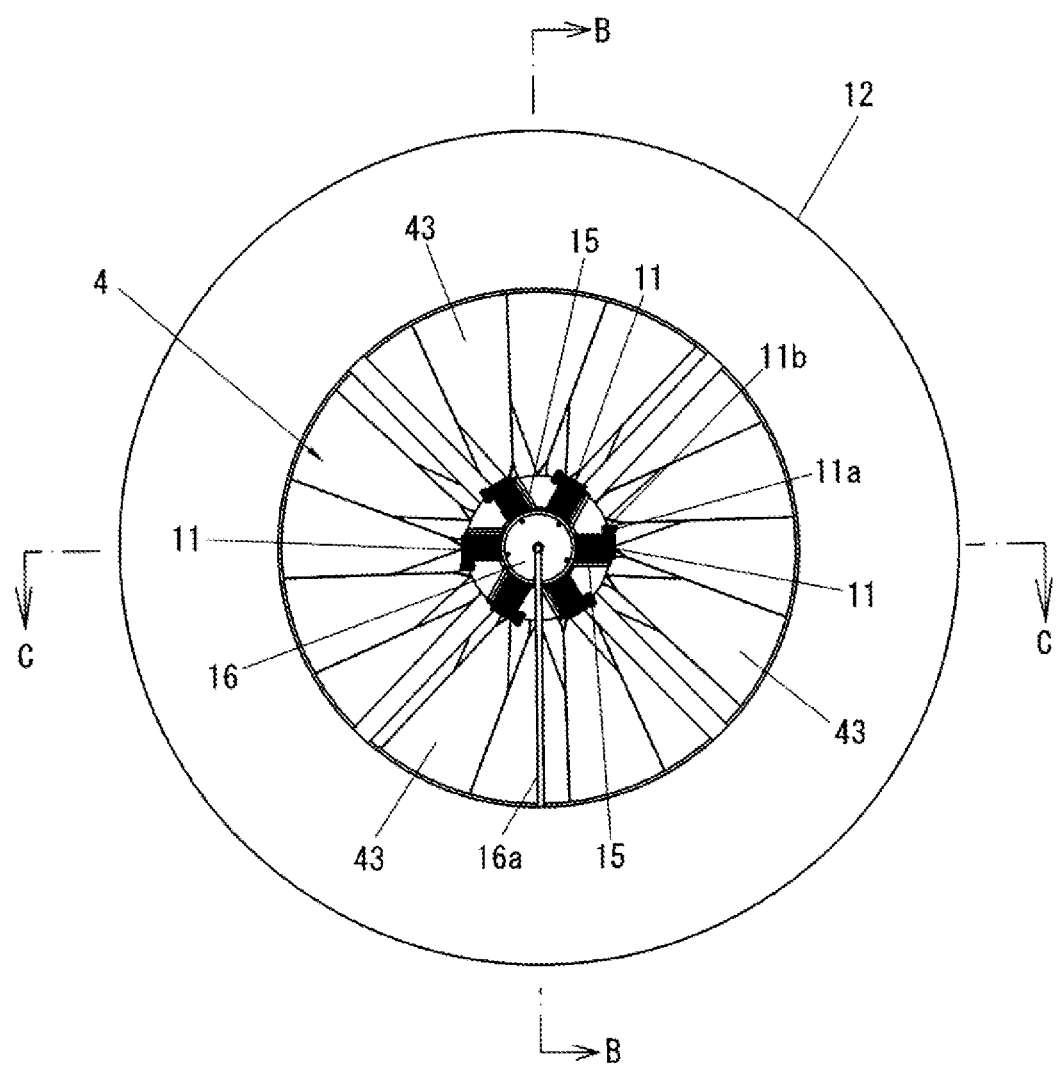

[Fig 4]
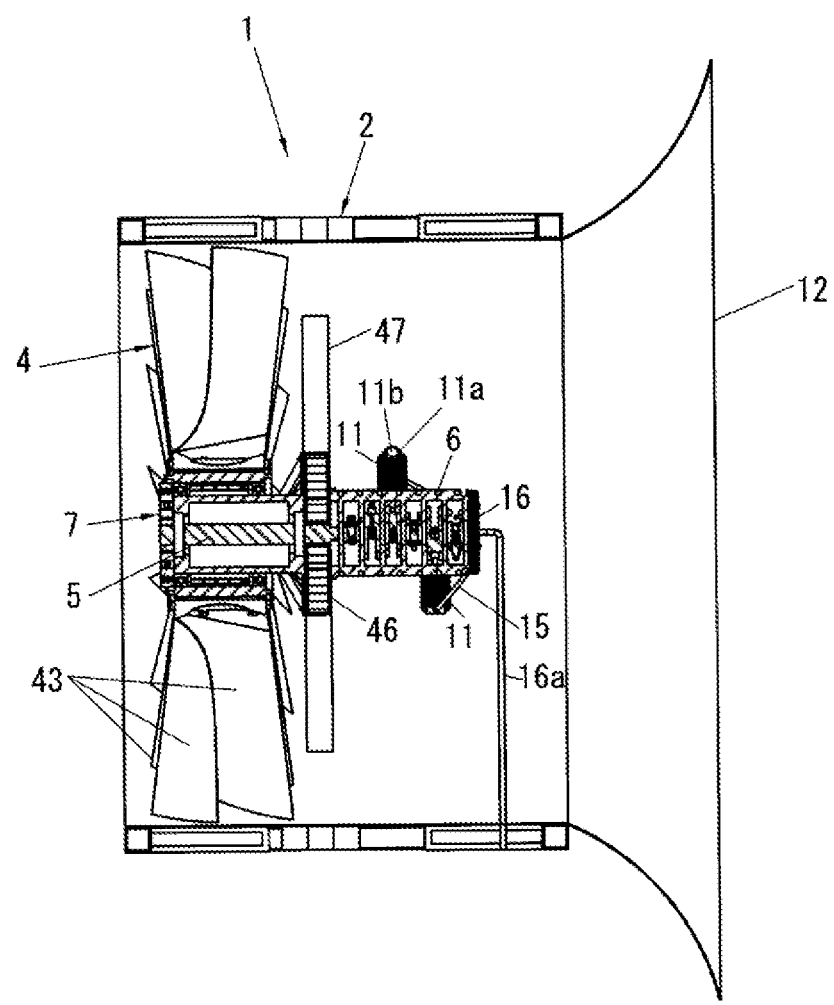

[Fig 5]
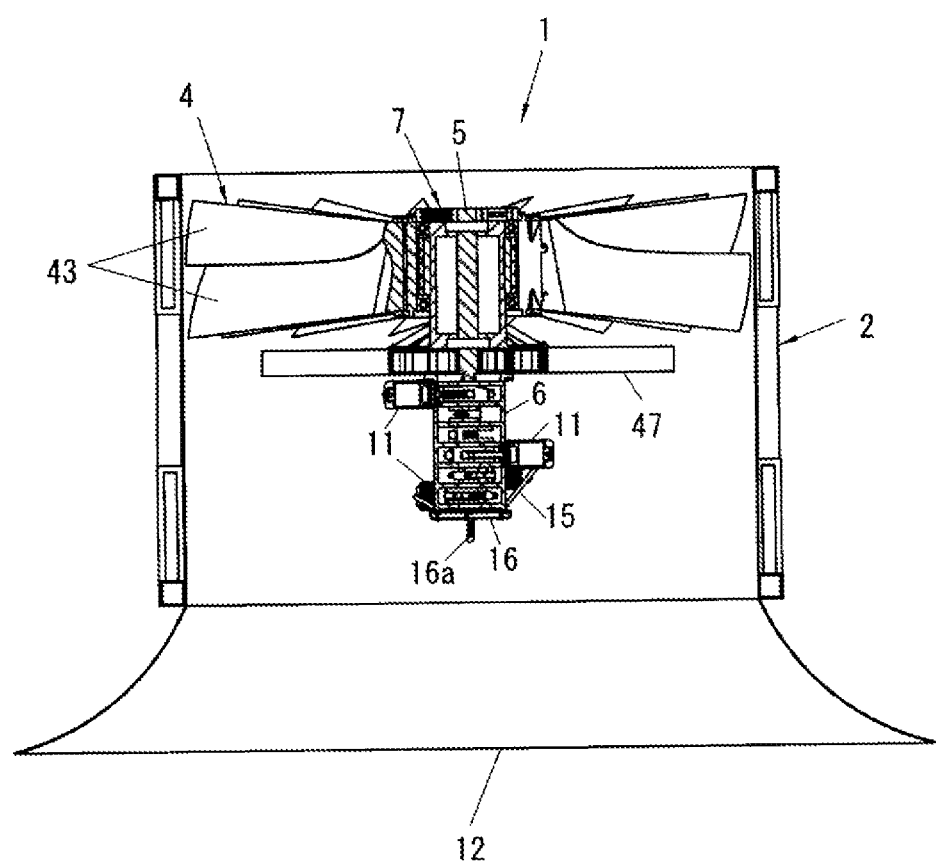

[Fig. 6]
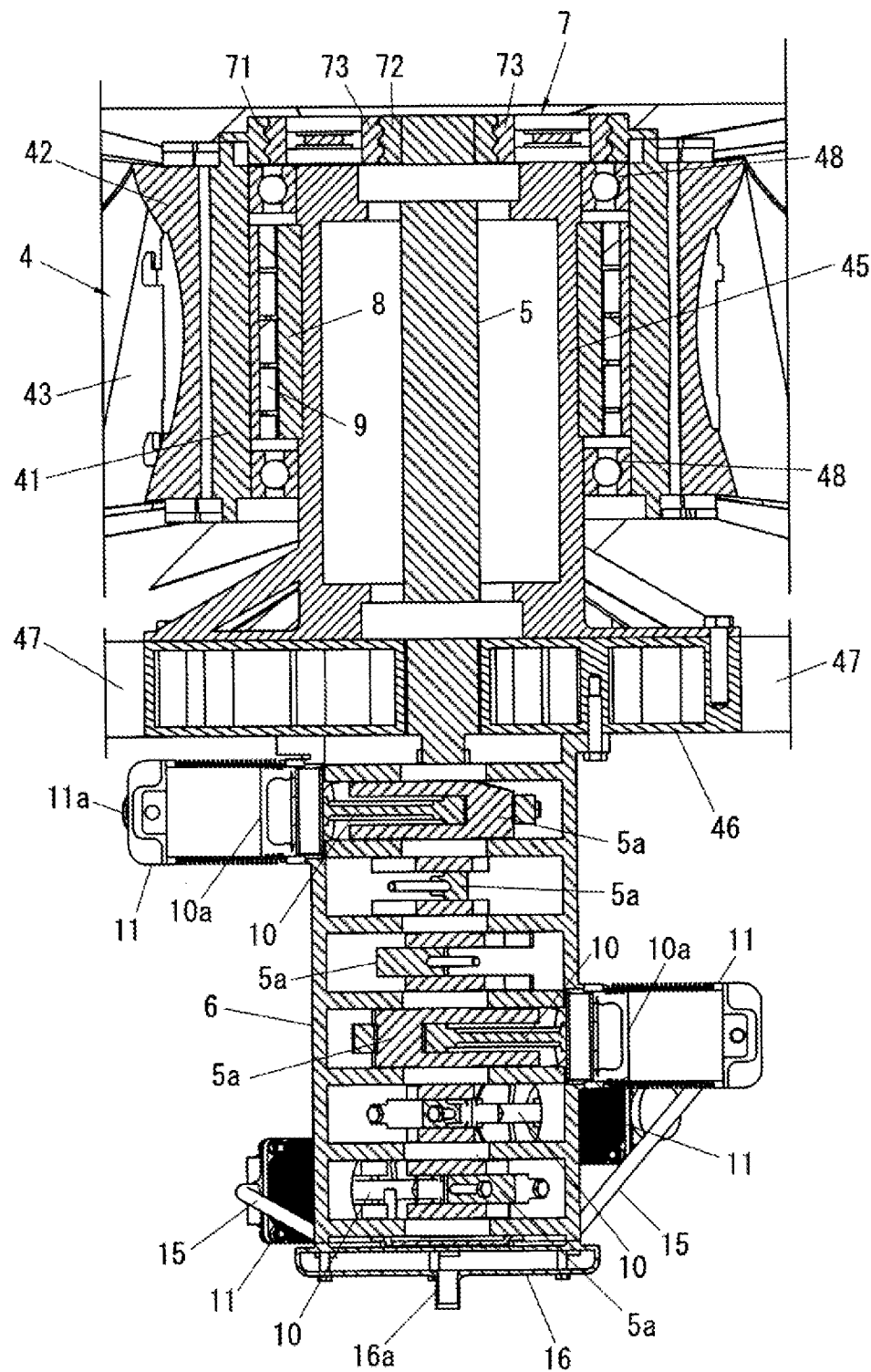

[Fig 7]
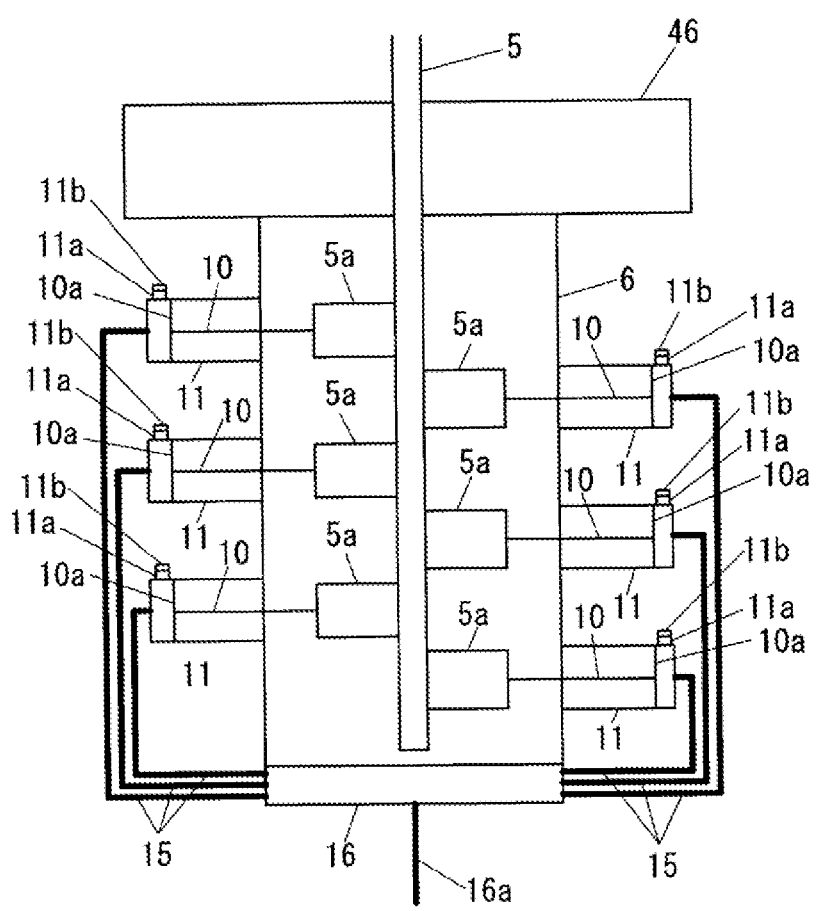

[Fig 8]
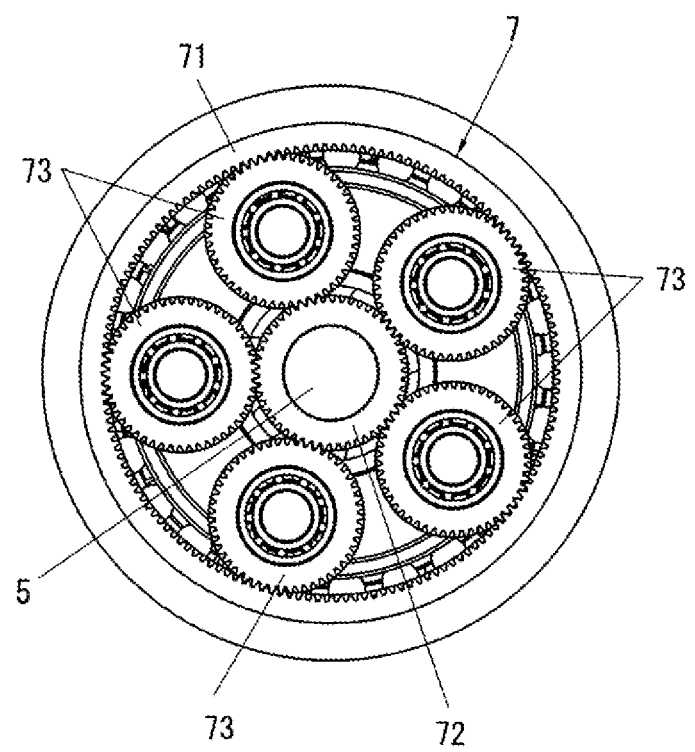

AIR COMPRESSION APPARATUS

TECHNICAL FIELD

The present invention relates to a reciprocating type air compression apparatus.

BACKGROUND ART

A reciprocating type air compression apparatus includes a piston that is driven to reciprocate using a driving force outputted from a power source, and a cylinder that changes in its volume as the piston reciprocates (see, for example, Patent Document 1). The power source may be an electric motor that outputs a rotational driving force. In this case, the rotational driving force outputted from the electric motor is converted to a reciprocating driving force by a conversion mechanism and transmitted to the piston.

When the piston moves from the top dead center to the bottom dead center within the cylinder, the volume of the cylinder is expanded to create a negative pressure in the cylinder, and air is introduced into the cylinder. The air introduced into the cylinder is compressed by the piston moving from the bottom dead center to the top dead center and the pressure is increased. Then compressed air (high pressure air) is sent to a tank through, for example, a predetermined path, and stored in the tank.

CITATION LIST

Patent Document

Patent Document 1: Japanese Patent Application Laid-Open No. 2016-50526

SUMMARY OF THE INVENTION

Technical Problems

However, in the aforementioned conventional air compression apparatus, since the electric motor is used as a driving source for reciprocating the piston, there is a problem that power supply equipment is required and it can not be used in a place not having the power supply equipment.

The present invention has been accomplished in view of the above circumstances, and an object thereof is to provide an air compression apparatus which can be used without requiring power supply equipment.

Solution to the Problems

In order to achieve the above object of the present invention, the air compression apparatus of the invention, comprises:

a cylindrical body;
an impeller which is provided inside the cylindrical body and rotatable by virtue of a wind flowed into the cylindrical body;
a rotary shaft provided coaxially with the impeller and rotatable about the same axis as the impeller;
a cylindrical casing accommodating at least a part of the rotary shaft;
a rotation transmission mechanism that transmits the rotation of the impeller to the rotary shaft while increasing the rotation speed of the rotary shaft;
a piston connected via a crank unit to the rotary shaft housed in the casing;
a cylinder provided on the outer peripheral wall of the casing and accommodating a piston capable of reciprocating therein;
an introduction unit provided in the cylinder for introducing air into the cylinder; and
a discharge pipe connected to the cylinder for discharging a compressed air compressed by the piston inside the cylinder.

In the present invention, since the rotation transmission mechanism is provided for transmitting the rotation of the impeller to the rotary shaft while increasing its rotation speed, the rotation speed of the impeller rotated by the wind (air) which has flowed into the cylindrical body can be transmitted to the rotary shaft while increasing its rotation speed by the rotation transmission mechanism.

Then, based on the rotation of the rotary shaft, piston reciprocates inside the cylinder via the crank unit. When the piston moves from the top dead center to the bottom dead center, the volume of the cylinder is expanded, and the pressure in the cylinder becomes negative, so that air is introduced into the cylinder. The air introduced into the cylinder is compressed by the piston moving from the top dead center to the bottom dead center, so that the pressure is increased, thus forming a high pressure compressed air. Then, the high pressure compressed air is discharged from the cylinder via the discharge pipe.

In this way, the air compression apparatus according to the present invention can compress air using a natural wind, and thus can be used without requiring power supply equipment.

Further, according to the present invention, it is preferable that the apparatus of the invention comprises a plurality of the pistons and the corresponding cylinders; and a collective discharge unit that at first collects and then discharges the compressed air discharged from the plurality of discharge pipes connected to the plurality of cylinders.

According to the above configuration, since a high pressure compressed air is collected from the plurality of cylinders to the collective discharge unit via the discharge pipes and then discharged from the collective discharge unit, it is possible to obtain a large amount of high pressure compressed air.

Moreover, according to the present invention, it is preferable that the introduction unit includes a filter for removing impurities such as dust from an air to be introduced into the cylinder.

According to such a configuration, since the air to be introduced into the cylinders is cleaned by removing impurities such as dust by using the filter, it is possible to prevent impurities from mixing into the compressed air to be obtained, without wounding cylinder and the piston by the impurities.

Further, according to the present invention, it is preferable that the cylindrical body is provided with a wind collection unit for collecting and introducing a wind into the cylindrical body.

According to this configuration, natural wind can be efficiently collected by the wind collection unit and introduced into the cylindrical body, so that the impeller can be efficiently rotated to obtain a compressed air.

Moreover, according to the present invention, the rotation transmission mechanism is constituted by a planetary gear mechanism; a ring gear of the planetary gear mechanism is attached to the impeller; a sun gear of the planetary gear mechanism is attached to the rotary shaft; and a planetary gear of the planetary gear mechanism meshes with the ring gear and the sun gear.

According to the above configuration, it is possible to easily adjust the speed-up amount of the rotary shaft by adjusting the number of teeth and the diameters of the ring gear, the planetary gear and the sun gear.

Further, according to the present invention, a fixed member is provided inside the impeller; and a permanent magnet is provided on any one of the impeller and the fixed member, while a coil is provided on the other of the impeller and the fixed member, with a predetermined gap formed between the permanent magnet and the coil.

According to such configuration, compressed air can be obtained by virtue of the rotation of the impeller using a natural wind, and an electric power can be generated through the cooperation between the permanent magnet and the coil.

Effects of the Invention

According to the present invention, since a natural wind can be used to compress air, it is possible to use the air compression apparatus without requiring power supply equipment.

BRIEF DESCRIPTION OF THE DRAWINGS

FIG. 1 is a perspective view when seen obliquely from the front side, showing an air compression apparatus according to an embodiment of the present invention.

FIG. 2 is a perspective view of the apparatus when seen obliquely from the rear side.

FIG. 3 is a front view of the apparatus.

FIG. 4 is a cross sectional view taken along B-B line in FIG. 3.

FIG. 5 is a cross sectional view taken along C-C line in FIG. 3.

FIG. 6 is a cross-sectional view of the essential portion of the apparatus.

FIG. 7 is a view schematically showing the essential portion of the apparatus.

FIG. 8 is a front view showing a planetary gear mechanism of the apparatus.

DESCRIPTION OF EMBODIMENTS

Hereinafter, embodiments of the present invention will be described with reference to the accompanying drawings.

FIG. 1 is a perspective view when seen obliquely from the front side, showing an air compression apparatus according to an embodiment of the present invention. FIG. 2 is a perspective view of the apparatus when seen obliquely from the rear side. FIG. 3 is a front view of the air compression apparatus according to the present embodiment. FIG. 4 is a cross sectional view taken along B-B line in FIG. 3. FIG. 5 is a cross sectional view taken along C-C line in FIG. 3. FIG. 6 is a cross-sectional view of the essential portion of the apparatus. FIG. 7 is a view schematically showing the essential portion of the apparatus. FIG. 8 is a front view showing a planetary gear mechanism (rotation transmission mechanism) of the apparatus.

The air compression apparatus 1 includes: a rectangular parallelepiped frame 2; a cylindrical body 3 provided inside the frame 2; an impeller 4 provided inside the cylindrical body 3; a rotary shaft 5 provided coaxially with the impeller 4; a cylindrical casing 6 accommodating a part of the rotary shaft 5; a rotation transmission mechanism 7 for transmitting the rotation speed of the impeller 4 to the rotary shaft 5 while increasing its rotation speed, a plurality of pistons 10 and cylinders 11; and a wind collection unit 12 for collecting and introducing the wind into the cylindrical body 3.

In the frame 2, the structural joints 21 are respectively arranged at eight corners (connection positions), and a plurality of rectangular tubular structural members 22 are connected to be formed into a rectangular parallelepiped configuration by virtue of the structural joints 21, thereby forming an assembled frame 2. Each structural joint 21 includes three joint members which allow the insertion and fixing of the ends of the structural members 22 thereinto. Each joint member is in a tubular shape and has a square cross section, with the base end portions thereof connected to each other by, for example, welding, adhesion or the like.

The cylindrical body 3 is formed in a cylindrical shape, and the length in its axial direction is substantially equal to the sides extending on the front and rear sides of the frame 2. Further, the diameter of the cylindrical body is substantially equal to the sides extending in the vertical direction of the frame 2 and the sides extending in the lateral direction. Therefore, the cylindrical body 3 is provided entirely inside the frame 2 with almost no extra internal space left therein. Further, the front and rear openings of the cylindrical body 3 are disposed at substantially the same positions as the front and rear surfaces (front and back) of the frame 2.

Further, the frame 2 is provided with four fixing rods 47 extending in oblique directions and facing inwardly inside the frame 2, with one end of each of these fixing rods 47 being fixed to structural member 22. Each fixing rod 47 passes through a hole formed in the cylindrical body 3 and the other end of each fixing rod 47 is fixed to a fixing unit 46 which will be described later. In addition, a through hole of the cylindrical body 3 and an adjacent part thereof are fixed to the fixing rods 47, so that the cylindrical body 3 can be supported by the fixing rods 47 and disposed properly inside the frame 2.

A wind collection unit 12 is provided at an opening on the front side of the cylindrical body 3. Such wind collection unit 12 is formed in a trumpet shape, and the inner diameter thereof becomes smaller towards the cylindrical body 3. Therefore, the wind collection unit 12 has its flow passage cross-section which becomes smaller from its opening 12a on the front side towards the opening 12b on its rear side. The diameter of the opening 12b on the rear side is approximately equal to the diameter of the cylindrical body 3, and the opening 12b is connected to the opening on the front side of the cylindrical body 3.

As shown in FIG. 6, the impeller 4 includes a cylindrical rotary member 41, a cylindrical mounting portion 42 fixed to the outer peripheral portion of the rotary member 41, and a plurality of blades 43 provided on outer peripheral portion of the mounting portion 42.

A cylindrical casing (fixed member) 45 is provided inside the rotary member 41. The front end (the lower side in FIG. 6) of the casing 45 is fixed to a disk-like fixing unit 46. The fixing unit 46 is fixed to a fixing rod 47 provided obliquely inside the frame 2. As shown in FIG. 1 and FIG. 2, the fixing rod 47 penetrates the through hole formed in the cylindrical body 3, and the fixing unit 46 is fixed to the tip (the other end) of the fixing rod 47.

Further, bearings 48, 48 are provided between the casing 45 and the rotary member 41 at a predetermined interval in the axial direction of the rotary member 41. Using the bearings 48, 48, the rotary member 41 can rotate around its axis while being supported by the casing 45.

Moreover, at the central portion in the radial direction of the casing 45, a rotary shaft 5 provided coaxially with the impeller 4 is disposed to be rotatable about its axis. The end on the front side (the lower side in FIG. 6) of the rotary shaft 5 penetrates the fixing unit 46 and is accommodated inside the casing 6. On the other hand, the rear end (the upper side in FIG. 6) of the rotary shaft 5 protrudes from the casing 45. A sun gear 72 (which will be described later) of the rotation transmission mechanism 7 is attached to an end of the rotary shaft 5.

Further, on the rear end surface (upper end surface in FIG. 6) of the casing 45, there is provided a planetary gear mechanism 7 as a rotation transmission mechanism 7 for transmitting the rotation of the impeller 4 to the rotary shaft 5 while increasing its rotation speed.

That is, as shown in FIGS. 6-8, the planetary gear mechanism 7 includes a ring gear 71, a sun gear 72 provided at the rotation center of the ring gear 71, and a plurality (five in FIG. 8) of planetary gears 73. Here, the rotation centers of the ring gear 71 and the sun gear 72 coincide with the rotation center of the rotary shaft 5.

A flange portion is formed on the outer peripheral portion of the ring gear 71, and this flange portion is fixed to the upper end portion of the rotary member 41. Therefore, when the impeller 4 is rotated, the rotary member 41 will be rotated accordingly. Then, when the rotary member 41 rotates, the ring gear 71 will also be rotated.

Further, the rear end (the upper end in FIG. 6) of the rotary shaft 5 is inserted and fixed into the sun gear 72. In this way, the rotary shaft 5 will be rotated by rotation of the sun gear 72.

Moreover, the planetary gear 73 meshes with the ring gear 71 and the sun gear 72. When the ring gear 71 rotates, it will revolve around the sun gear 72 while at the same time rotating by itself. Therefore, when the ring gear 71 rotates, the planetary gear 73 will revolve and thus move with itself rotating inside the ring gear 71. In this way, the sun gear 72 will rotate about its axis.

The number of teeth and the diameters of the ring gear 71, the planetary gear 73 and the sun gear 72 are set such that when the ring gear 71 rotates once by virtue of the impeller 4, the sun gear 72 will rotate 10 times. Therefore, in such a planetary gear mechanism 7, the rotation speed of the impeller 4 is increased 10 times to rotate the sun gear 72, and the rotary shaft 5 is rotated at a rotation speed which is 10 times that of the impeller 4, by virtue of the rotation of the sun gear 72.

Further, a casing (fixed member) 45 is provided inside the impeller 4, and a cylindrical coil 8 is fixed to the outer peripheral surface of the casing 45. On the other hand, a permanent magnet 9 is fixed to the inner peripheral surface of the rotary member 41 of the impeller 4, with a predetermined interval formed between the permanent magnet 9 and the coil 8.

Then, electricity is generated by the cooperation between the coil 8 and the permanent magnet 9, and this electricity is stored in the battery or used directly.

On the other hand, it is also possible to fix the permanent magnet 9 to the outer peripheral surface of the casing 45, and to fix the coil 8 to the inner peripheral surface of the rotary member 41.

In this way, it is possible to assemble a power generation apparatus including the coil 8 and the permanent magnet 8 inside the impeller 4.

As shown in FIG. 6, the rotary shaft 5 penetrates the front end of (the lower side in FIG. 6) of the casing 45. Further, as shown in FIG. 6 and FIG. 7, the rotary shaft 5 further penetrates the fixing unit 46 and is extending into the cylindrical casing 6. In fact, the rotary shaft 5 is partially (approximately the front half of the rotary shaft 5) accommodated into the cylindrical casing 6. As shown in FIG. 6, flanges 51 are provided at a predetermined interval in the axial direction on the rotary shaft 5 housed inside the casing 6. These flanges 51 are freely rotatably supported by annular plate-shaped partition walls 61 provided at a predetermined interval in the axial direction inside casing 6. In this way, the rotary shaft 5 housed inside the casing 6 can be rotatably supported.

Further, a plurality of (for example, six) crank units 5a are provided at a predetermined interval in the axial direction on the rotary shaft 5 housed inside the casing 6, each crank unit 5a being connected with the base end of a piston On the other hand, the outer peripheral wall of the casing 6 are provided a plurality of (for example, six) cylinders 11, each accommodating a piston 10 capable of reciprocating movement. The plurality of cylinders 11 are disposed at a predetermined interval in the axial direction of the rotary shaft 5 and are disposed at a predetermined interval in the circumferential direction of the casing 6.

Then, when the rotary shaft 5 is rotated, each crank unit 5a is rotated about the axis of the rotary shaft 5, so that each piston 10 reciprocates in the radial direction of the casing 6, and each disc-like piston main body 10a can have a reciprocating movement between the top dead center and the bottom dead center within the cylinder 11.

Further, each cylinder 11 is provided with an introduction unit 11a for introducing outside air into the cylinder 11. The introduction unit 11a is formed in a cylindrical shape, and is fixed to the outer peripheral wall of the upper end portion of the cylinder 11. The introduction unit 11a and the interior of the cylinder 11 are communicate with each other, and outside air can be introduced into the cylinder 11 through the introduction unit 11a. Here, the introduction unit 11a is provided with a check valve for preventing the air inside the cylinder 11 from being pulled out.

Further, the introduction unit 11a is provided with a filter 11b at its front end, and the filter 11b removes impurities such as dust from the air to be introduced into the cylinder 11.

Further, one end of each discharge pipe 15 is connected to the outer wall of the upper end of each cylinder 11. The connection position of the discharge pipe 15 is a position facing the introduction unit 11a. Here, the discharge pipe 15 is provided for discharging the compressed air compressed by the piston 10 inside the cylinder 11, and the other end of the discharge pipe 15 is connected to the collective discharge unit 16.

The collective discharge unit 16 is a disk-like member with its inside being hollow, and is provided at the front end portion of the casing 6 and is coaxial with the casing 6. The other end of each discharge pipe 15 is connected to the outer peripheral wall of the collective discharge unit 16, with the inside of the discharge pipe 15 and the inside of the collective discharge unit 16 being communicated with each other. Therefore, the high pressure compressed air discharged from the plurality of discharge pipes 15 connected to the plurality of cylinders 11 can thus be collected and flow into the collective discharge unit 16.

The collective discharge unit 16 has a collective discharge pipe 16a connected to the end face thereof, thereby rendering it possible to discharge the high pressure compressed air from the collective discharge unit 16 through the collective discharge pipe 16a.

The air compression apparatus 1 having such a configuration as described above is installed and used, for example, on the roof of a building. In this case, the wind collection unit 12 of the air compression apparatus 1 is installed on the windward side.

When the wind flows inwardly through the opening 12a on the front side of the wind collection unit 12, since the flow cross-section of the wind collection unit 12 decreases toward the rear opening 12b, the wind is squeezed and the flow velocity thereof is increased before flowing into the cylindrical body 3.

When the wind flows into the cylindrical body 3, the impeller 4 inside the cylindrical body 3 is rotated by the wind. Then, the rotation speed of the impeller 4 is increased by the rotation transmission mechanism (planet gear mechanism) 7 and transmitted to the rotary shaft 5.

When the rotary shaft 5 rotates, the piston main body 10a of each piston 10 reciprocates in the cylinder 11 between the top dead center and the bottom dead center via the crank unit 5a provided on the rotary shaft 5.

When the piston main body 10a moves from the top dead center to the bottom dead center, the volume of the cylinder 11 is expanded and the interior of the cylinder 11 becomes negative pressure. Accordingly, outside air (a part of the air flowed into the cylindrical body 3 from the wind collection unit 12) will be introduced into the cylinder 11, and the air introduced into the cylinder 11 is thus compressed by the piston body 10a moving from the bottom dead center to the top dead center, thereby increasing the air pressure and forming a high pressure compressed air. Then, the high pressure compressed air is discharged from the cylinder 11 through the discharge pipe 15.

The high pressure compressed air discharged from the plurality of cylinders 11 by way of the discharge pipes 15 is collected into the collective discharge unit 16 through the plurality of discharge pipes 15 and then discharged from the collective discharge pipe 16a of the collective discharge unit 16, thus rendering it possible to obtain a large amount of high pressure compressed air.

In this way, since the air compression apparatus 1 according to the present embodiment can compress an air using natural wind, it can be used without requiring power supply equipment. Further, the high-pressure compressed air obtained by using the air compression apparatus 1 can be used, for example, in a power generation apparatus which uses a compressed air, and in a process of producing oxygen using a zeolite filter, or can be used as a new type of energy. Here, as a new type energy, the compressed air may be stored in a high pressure tank, and such compressed air may be supplied from this high pressure tank to a cylinder of a car engine to drive the car.

Further, the introduction unit 11a provided in the cylinder 11 is provided with a filter 11b, and the air introduced into the cylinder 11 is cleaned by removing impurities such as dust therefrom using the filter 11b. Therefore, it is possible to prevent impurities from mixing into compressed air to be obtained, thereby preventing the cylinder 11 and the piston 10 from being wounded by the impurities.

Furthermore, since the cylindrical body 3 is provided with a wind collection unit 12 for collecting and introducing the wind into the cylindrical body 3, it is possible to efficiently collect a natural wind by virtue of the wind collection unit 12, and introduce the wind into the cylindrical body 3. Therefore, it is possible for the impeller 4 to be rotated efficiently, thus obtaining a desired compressed air.

Further, since the rotation transmission mechanism 7 is constituted by the planetary gear mechanism 7, and since the ring gear 71 of the planetary gear mechanism 7 is attached to the impeller 4, and also since the sun gear 72 is attached to the rotary shaft 5, and the planetary gear 73 engages the ring gear 71 and the sun gear 72, it is possible to easily adjust the speed increasing amount of the rotary shaft 5 by adjusting the number of teeth and the diameters of the ring gear 71, the planetary gear 73 and the sun gear 72.

In addition, since the casing 45 is provided inside the impeller 4 and a permanent magnet 9 is provided on one of the impeller 4 and the casing 45, and a coil 8 is provided on the other of the impeller 4 and the casing 45 with a predetermined gap formed therebetween, it is possible to obtain a desired compressed air and perform a power generation through the cooperation between the permanent magnet 9 and the coil 8, by using only a natural wind and through the rotation of the impeller 4.

Although in the present embodiment, the planetary gear mechanism 7 is used as the rotation transmission mechanism for transmitting the rotation of the impeller 4 to the rotary shaft 5 while increasing its rotation speed, it is also possible to use other rotation transmission mechanism than the planetary gear mechanism 7, provided that the rotation of the impeller 4 can be transmitted to the rotary shaft 5 while increasing its rotation speed.

EXPLANATION OF REFERENCE NUMERALS 1 air compression apparatus
3 cylindrical body
4 impeller
5 rotation axis
5a crank unit
6 casing
7 planetary gear mechanism (rotation transmission mechanism)
8 coil
9 permanent magnet
10 pistons
11 cylinders
11a Introduction unit
11b filter
15 discharge pipe
16 collective discharge unit
45 casing (fixed member)
71 ring gear
72 sun gear
73 planetary gear

The invention claimed is:
1. An air compression apparatus, comprising:
a cylindrical body;
an impeller which is provided inside the cylindrical body and rotatable by virtue of a wind flowed into the cylindrical body;
a rotary shaft provided coaxially with the impeller and rotatable about the same axis as the impeller;
a cylindrical casing accommodating at least a part of the rotary shaft;
a rotation transmission mechanism that transmits the rotation of the impeller to the rotary shaft while increasing the rotation speed of the rotary shaft;
a piston connected via a crank unit to the rotary shaft housed in the casing;
a cylinder provided on the outer peripheral wall of the casing and accommodating a piston capable of reciprocating therein;
an introduction unit provided in the cylinder for introducing air into the cylinder; and a discharge pipe connected to the cylinder for discharging a compressed air compressed by the piston inside the cylinder, wherein:

the impeller is provided at one end of the cylindrical body on a wind downstream side, the rotary shaft is provided within the cylindrical body, extending from inside the impeller towards a wind upstream side, the cylindrical casing is provided within the cylindrical body, extending coaxially with the rotary shaft and accommodating a portion of the rotary shaft protruding from the impeller, the rotation transmission mechanism includes a planetary gear mechanism, a ring gear of the planetary gear mechanism is attached to a cylindrical rotary member forming a base of the impeller, a sun gear of the planetary gear mechanism is attached to the rotary shaft, and a planetary gear of the planetary gear mechanism meshes with the ring gear and the sun gear.

2. The air compression apparatus according to claim 1, further comprising:

a plurality of the pistons and the corresponding cylinders; and a collective discharge unit that at first collects and then discharges the compressed air discharged from the plurality of discharge pipes connected to the plurality of cylinders.

3. The air compression apparatus according to claim 1, wherein the introduction unit includes a filter for removing impurities such as dust from an air to be introduced into the cylinder.

4. The air compression apparatus according to claim 1, wherein the cylindrical body is provided with a wind collection unit for collecting and introducing a wind into the cylindrical body.

5. The air compression apparatus according to claim 1, wherein a fixed member is provided inside the impeller; and a permanent magnet is provided on any one of the impeller and the fixed member, while a coil is provided on the other of the impeller and the fixed member, with a predetermined gap formed between the permanent magnet and the coil.

* * * * *